United States Patent [19]

Gitin et al.

[11] 3,975,130

[45] Aug. 17, 1976

[54] INSTALLATION FOR PRODUCING GLASSCERAMIC TILES

[76] Inventors: Yakov Aronovich Gitin, Brest-Litovsky prospekt, 17,, kv. 123, Kiev; Konstantin Timofeevich Bondarev, ulitsa Nizhnaya Pervomaiskaya, 33, kv. 171, Moscow; Yakov Borisovich Leschinsky, ulitsa Fedorova, 16, kv. 13, Kiev; Fedor Efimovich Zabkov, ulitsa Stadionnaya, 59, kv. 34; Vasily Gavrilovich Parfimovich, ulitsa Oktyabrskaya, 274, kv. 28, both of Konstantinovka Donetskoi oblasti, all of U.S.S.R.; Asty Sevastyanovich Ruga, deceased, late of Konstantinovka Donetskoi oblasti, U.S.S.R., by Viktor Astievich Ruga, administrator, ulitsa Pushkinskaya, 291, kv. 47, Konstantinovka Donetskoi oblasti, U.S.S.R.

[22] Filed: Mar. 20, 1975

[21] Appl. No.: 560,113

Related U.S. Application Data

[63] Continuation of Ser. No. 497,264, Aug. 14, 1974, abandoned, which is a continuation of Ser. No. 412,823, Nov. 5, 1973, abandoned, which is a continuation of Ser. No. 239,611, March 30, 1972, abandoned.

[52] U.S. Cl. .......... 425/404; 425/455 R; 214/18 R; 425/DIG. 200

[51] Int. Cl.[2] .......... B29C 25/00

[58] Field of Search .. 425/404, 445, 455, DIG. 200, 425/DIG. 201; 214/18 R, 18 GD

[56] References Cited

UNITED STATES PATENTS

| | | | |
|---|---|---|---|
| 1,334,024 | 3/1920 | Embrey | 425/371 X |
| 3,034,455 | 5/1962 | Roth et al. | 425/404 X |
| 3,386,713 | 6/1968 | Karr | 425/404 X |
| 3,492,704 | 2/1970 | Schwellenbach | 425/404 X |

*Primary Examiner*—Robert L. Spicer, Jr.
*Attorney, Agent, or Firm*—Holman & Stern

[57] ABSTRACT

An installation for producing glassceramic tiles having a device for laying tiles onto the bottom of a roasting kiln located between a tile transfer conveyer and the roasting kiln, the device incorporating a table to receive the tiles from the conveyer, the table being mounted so as to be free to perform reciprocating motion in the transversal direction with respect to the kiln arrangement, as well as having a bar arranged transversely with respect to the table and so being mounted as to be free to move only to one side from its vertical position in the direction of the table working stroke.

2 Claims, 4 Drawing Figures

INSTALLATION FOR PRODUCING GLASSCERAMIC TILES

This is a continuation of application Ser. No. 497,264 filed Aug. 14, 1974 which in turn is a continuation of Ser. No. 412,823 filed Nov. 5, 1973, which in turn is a continuation of Ser. No. 239,611 filed Mar. 30, 1972, all now abandoned.

BACKGROUND OF THE INVENTION

This invention relates to the production of brickware or tilings and, more specifically, to an installation for producing glassceramic tiles.

Widely known in the art are installations for producing glassceramic tiles, comprising a train of the following units: a melt bath, a proportioning device, a rotary press, a conveyer and a tunnel-type roasting kiln with movable bottom.

These installations make no provision for mechanical means to transfer tiles from the conveyor to the kiln bottom and lay them in rows. Until now, these operations were carried out manually.

SUMMARY OF THE INVENTION

It is an object of the present invention to eliminate the afore-said disadvantage inherent in the installations used heretofore for producing glassceramic tiles.

It is another object of the present invention to provide an installation design that will enable the tiles to be taken from the conveyor, transferred onto the kiln bottom and laid in rows.

These objects are achieved by an installation for producing glassceramic tiles, comprising a tile shaping unit, a roasting kiln and a conveyor to transfer tiles from the shaping unit to the kiln, and according to the invention, a device for laying the tiles onto the kiln bottom, which incorporates a table for receiving the tiles from the conveyor, with the table being mounted such as to have the ability to move reciprocatingly in the transverse direction relative to the kiln arrangement, and the installation being provided with a bar mounted transversely with respect to the table and so arranged as to freely deflect only to one side of the vertical plane, and in the direction of the table working stroke.

Such a design makes it possible not only to rule out manual labor but also greatly increases labor efficiency.

To ensure that rows of tiles are stacked in tiers, the table of the tile laying device is expediently mounted with the capability of performing up-and-down working strokes.

BRIEF DESCRIPTION OF THE DRAWINGS

Given below is a detailed description of a specific exemplary embodiment of the present invention with due reference to the accompanying drawings, wherein.

DETAILED DESCRIPTION OF THE PREFERRED EMBODIMENT

Figure 4:
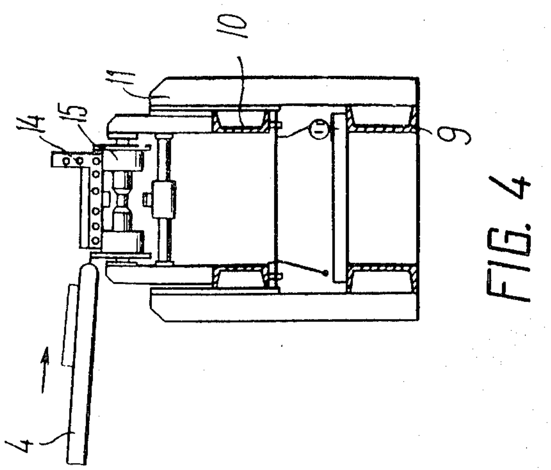
FIG. 4 is a sectional view taken along line IV-IV in FIG. 2.

The installation of the invention comprises: a tile shaping unit which incorporates a melt bath 1 (FIG. 1); a mechanical proportioner 2 which meters a portion of the melt sufficient to produce a single tile; and a rotary press 3; the installation also comprises a chain conveyor 4 (FIGS. 1, 3, 4) to transfer press-shaped tiles from the press 3 to a device 5 (FIGS. 1–4) for laying the tiles onto the movable bottom of a roasting kiln 6 (FIGS. 1–3) of the tunnel-type.

Figure 1:
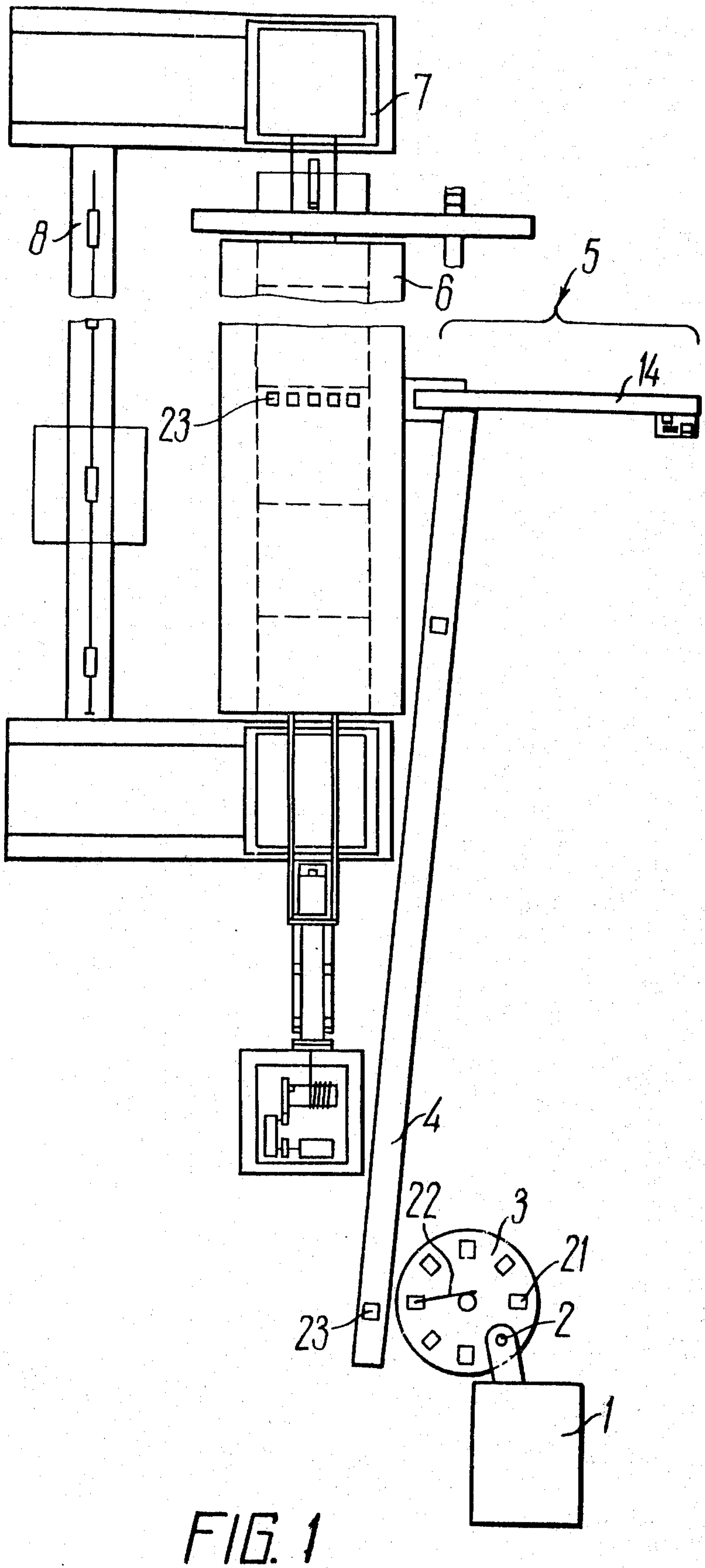
FIG. 1 is a general diagrammatic view of an installation for producing glassceramic tiles, according to the invention.

The movable bottom of the kiln 6 is formed by cars 7 (FIGS. 1, 2) which have passed through the kiln are returned thereinto by means of a by-pass track 8 (FIG. 1).

The tile laying device 5 comprises a base 9 (FIGS. 2 and 4) which carries a frame 10 (FIGS. 2, 4) mounted on the base 9 in guideways 11 so as to perform up-down motion. This motion is imparted from a hydraulic ram 12 (FIG. 2) whose rod is connected to the frame 10 through a linkage actuator 13.

The frame 10 carries a table 14 (FIGS. 1–4) to receive the tiles from the conveyor 4.

The table 14 is mounted on the frame 10 on rollers 15 (FIGS. 2, 4) along which it is free to reciprocate both lengthwise and transverse with respect to the bottom of the kiln 6. The movements of the table are imparted by means of an electric motor 16 (FIG. 3) via a chain drive 17 (FIGS. 2, 3) whose chain is associated with the table 14.

The movable frame 10 carries a bar 19 mounted on stands 18 (FIG. 2), the bar being arranged transversal the table 14 and held in a horizontal hinge 20 (FIG. 2) which permits it to freely deflect towards the kiln, i.e., in the direction of the working stroke of the table 14, and to return to the initial (vertical) position.

The tile making installation of the invention operates as follows.

A bath of melt is metered by the proportioner 2 and fed from the melt bath into press-moulds 21 (FIG. 1) of the press 3, the press-moulds being fed through the proportioner 2 in succession during press rotation.

The press-shaped tiles are fed by a kicker 22 onto the conveyor 4 which transfers them to the device 5. Tiles 23 (FIGS. 1, 2, 3) are fed from the conveyor 4 onto the table 14 of the device 5. The tiles 23 are prevented from piling up as they move from the conveyor 4 onto the table 14 by means of a cover (not shown in the drawings) provided over the conveyor 4 and having an opening equal to the thickness of a single tile 23.

Once a tile 23 reaches the table 14 the latter travels towards the kiln through one pitch (step). As a result the bar 19 deflects in the same direction when being actuated by the tile 23 and passes the tile freely into the kiln.

The table 14 keeps travelling towards the kiln through one pitch (step) after each tile 23 is feed to the table until table 14 extends across the entire width of the car 7 of the kiln 6 bottom. The length of the table 14 is greater than the width of the car 7. The car 7 is stationary while the tiles 23 are being moved towards the kiln. The tiles are retained by the bar 19 and move onto the car 7 of the bottom of the kiln 6 upon return movement of the table 14.

Figure 2:
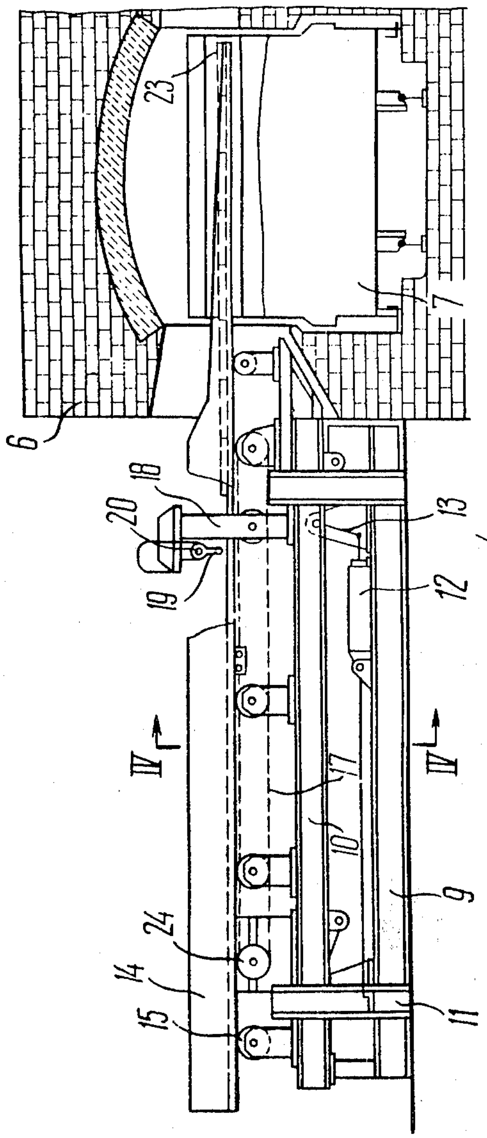
FIG. 2 is a side elevation view of a device for laying tiles onto the kiln bottom.
Figure 3:
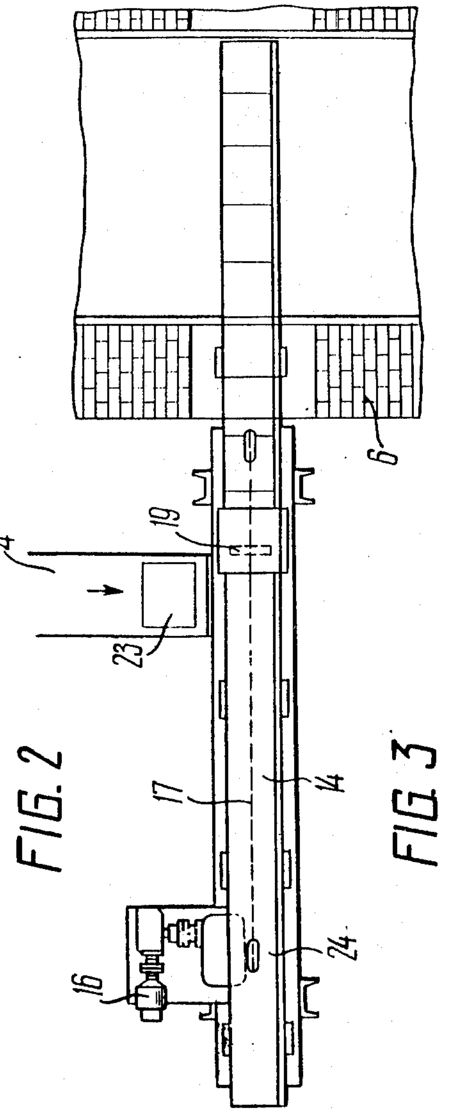
FIG. 3 is a plan view of FIG. 2.

This being done, the chain drive 17 of the table 14 is reversed. This is accomplished due to the fact that the ends of the chain drive 17 are attached to the table 14 and fitted onto an idle sprocket and a drive sprocket 24 (FIGS. 2 and 3). The shaft of the drive sprocket 24 of the chain drive 17 is connected to the output shaft of the electric motor 16 through two electromagnetic clutches which may reverse the chain 17 by being engaged alternatively.

When the table performs the reverse stroke the bar 19 that has assumed the vertical position by its own weight is held in that position because of the hinge 20 thus precluding reverse movement of the tiles.

At the same time the table 14 is withdrawn from under the tiles thus leaving them on the kiln bottom arranged crosswise in a row.

To lay a second (top) tier of tiles in a row in the kiln 6, the hydraulic ram 12 is actuated causing the movable frame 10 to travel upwards along the guideways 11 to the height of the top tier in the kiln bottom until it rests against the stops (not shown in the drawings) provided on the base 9. Further cycles of laying tile rows onto the kiln bottom is repeated as described above.

Thereupon the car 7 moves through the kiln and both cycles of laying the tiles in two tiers are repeated in the same way as stated above.

What we claim is:

1. An installation for producing glassceramic tiles comprising: a tile shaping unit; a roasting kiln having a movable bottom; a conveyor to transfer tiles from the tile shaping unit to the roasting kiln; a reversible table mounted on a frame, interposed between the conveyor and the roasting kiln to receive the tiles from the conveyor and movable in a transverse direction with respect to the movement of the movable bottom of the roasting kiln so that the table is provided with both a working motion in the direction towards the kiln and a return motion backwards from the kiln to its initial position; a one-way pivoted bar arranged transversely with respect to the table so that during the working motion of the table the bar pivots in the direction of the motion, and during the backward motion of the table the bar assumes a rigid vertical position to push the tiles onto the movable bottom in the kiln.

2. The installation as claimed in claim 1, wherein the table is mounted on the frame by means of guides and adapted to perform positive up and down motion along the guides to place the tiles in tiers, one above the other.

* * * * *